United States Patent
Gouabau et al.

(10) Patent No.: US 12,511,366 B2
(45) Date of Patent: Dec. 30, 2025

(54) METHOD FOR RECORDING ON A CARD BIOMETRIC DATA OF A HOLDER OF THIS CARD

(71) Applicant: STMicroelectronics International N.V., Geneva (CH)

(72) Inventors: Frederic Gouabau, Betton (FR); Frederic Piquet, Saint Sulpice la Foret (FR)

(73) Assignee: STMicroelectronics International N.V., Geneva (CH)

( * ) Notice: Subject to any disclaimer, the term of this patent is extended or adjusted under 35 U.S.C. 154(b) by 101 days.

(21) Appl. No.: 18/400,545

(22) Filed: Dec. 29, 2023

(65) Prior Publication Data

US 2024/0370547 A1    Nov. 7, 2024

(30) Foreign Application Priority Data

Jan. 12, 2023  (FR) ........................................ 2300305
Nov. 17, 2023  (FR) ........................................ 2312623

(51) Int. Cl.
*G06F 21/34*  (2013.01)
*G06K 19/07*  (2006.01)
*H04B 5/70*  (2024.01)

(52) U.S. Cl.
CPC ......... *G06F 21/34* (2013.01); *G06K 19/0718* (2013.01); *H04B 5/70* (2024.01)

(58) Field of Classification Search
CPC ........ G06K 19/0718; G06F 21/34; H04B 5/70
USPC ............................................................ 713/186
See application file for complete search history.

(56) References Cited

U.S. PATENT DOCUMENTS

| | | | |
|---|---|---|---|
| 2009/0235086 A1* | 9/2009 | Lai | G06F 21/32 713/186 |
| 2018/0167386 A1* | 6/2018 | Bhatt | G06Q 20/40145 |
| 2020/0013032 A1* | 1/2020 | Moskowitz | G06Q 20/105 |
| 2021/0035109 A1* | 2/2021 | Wong | G07F 7/0833 |
| 2021/0374218 A1 | 12/2021 | Humborstad et al. | |
| 2024/0403882 A1* | 12/2024 | Eaton | G07F 7/1025 |

* cited by examiner

*Primary Examiner* — Zi Ye
(74) *Attorney, Agent, or Firm* — Seed IP Law Group LLP

(57) ABSTRACT

According to one aspect, a method for recording biometric data of a holder on a card including a microcontroller configured to communicate via a secure communication channel with a remote server comprising an account linked to the card holder, the method comprising:
  authenticating the holder on an application of a device configured to communicate with said server and said card, then
  authenticating the server by the card via the secure communication channel by means of the application of said device, then
  recording the biometric data of the holder by a fingerprint reader of the card controlled by the microcontroller of the card if the server is authenticated by the card.

14 Claims, 2 Drawing Sheets

[Fig. 1]
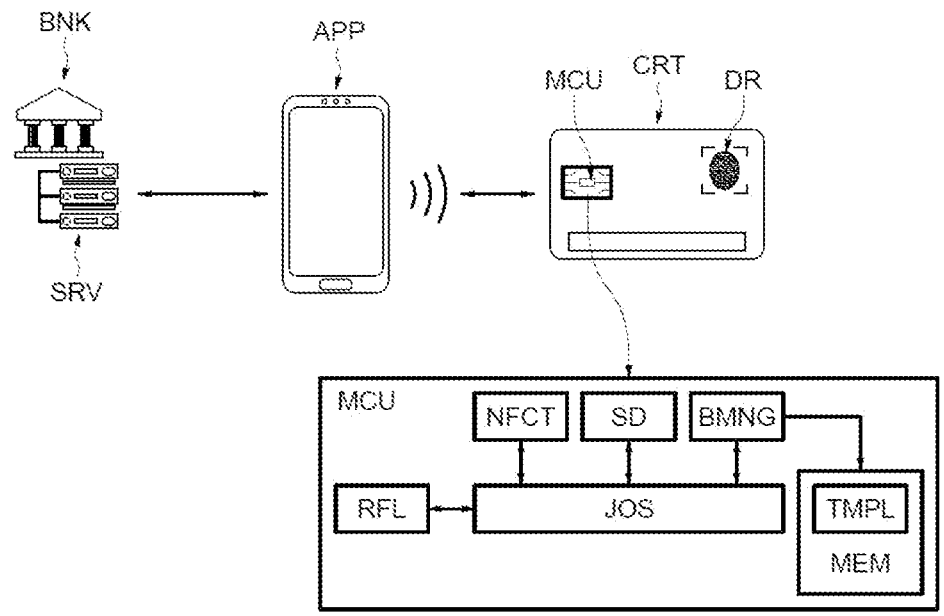
[Fig. 2]
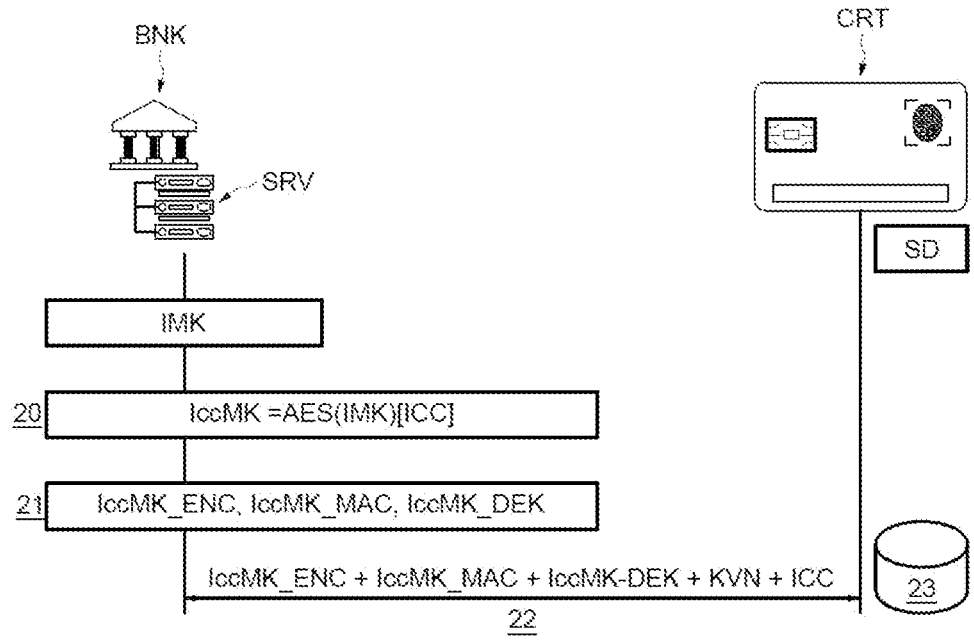

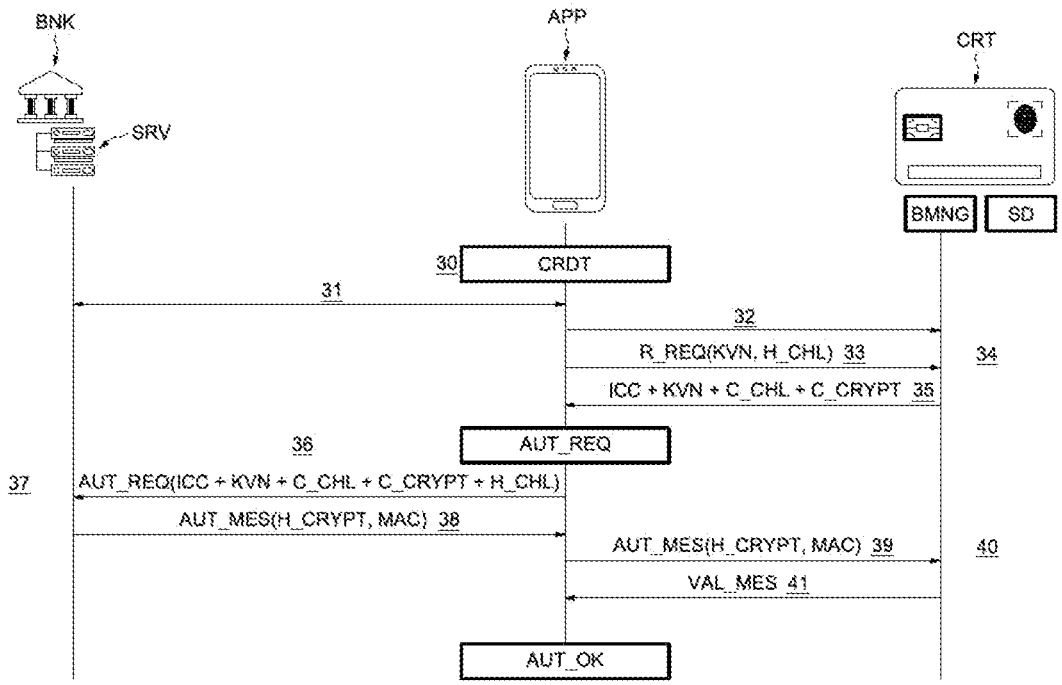
[Fig. 3]
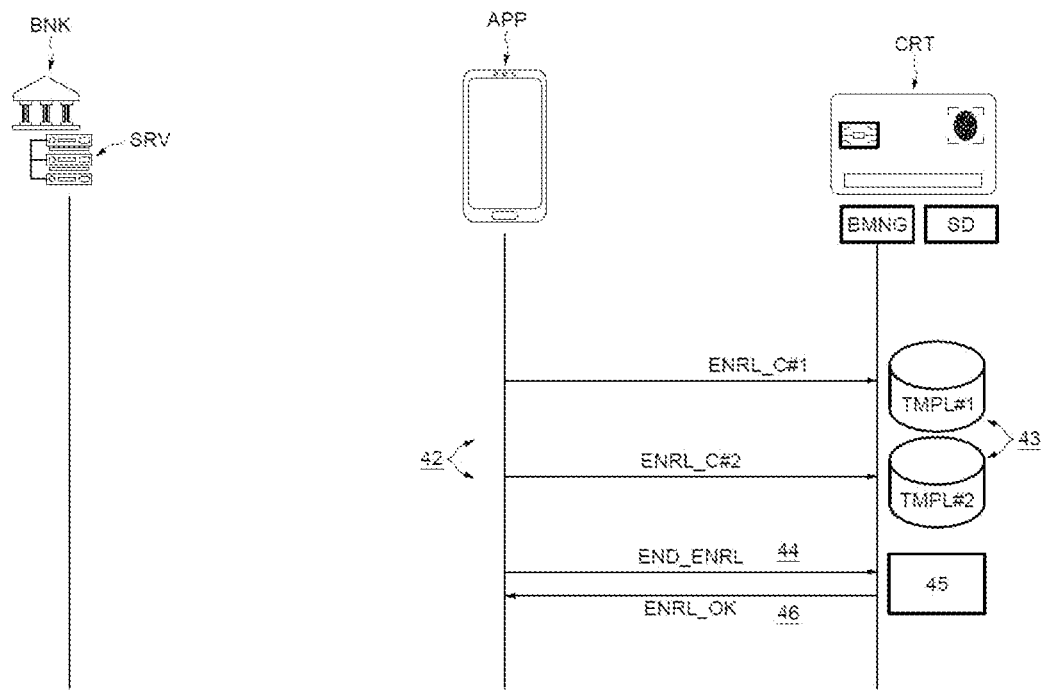
[Fig. 4]

METHOD FOR RECORDING ON A CARD BIOMETRIC DATA OF A HOLDER OF THIS CARD

BACKGROUND

Technical Field

Embodiments and implementations relate to the recording of biometric data of a card holder on their card, for example, a payment card.

Description of the Related Art

Cards are known, particularly payment cards, which may require the entry of a confidential code (Personal Identification Number (PIN code)) in order to be used. This confidential code is only known by the card holder. The entry of the confidential code makes it possible to authenticate that the user is indeed the legal card holder.

Biometric cards are also known that use biometric data, such as the digital fingerprints of a user, to verify if the user of the card does indeed correspond to the card holder.

These biometric data make it possible to replace the entry of a confidential code (PIN code) to verify if the user of the card does indeed correspond to the authorized card holder.

In particular, a biometric card comprises a digital fingerprint reader for acquiring biometric data relating to the digital fingerprints of the user. The acquired biometric data are subsequently compared with biometric data associated with the card holder that are stored in the card.

The biometric data associated with the card holder are only known by the card, and therefore are never transmitted outside of the card.

Therefore, it should be made sure that the biometric data stored in the card do indeed correspond to those of the card holder.

Thus, recording in the card the biometric data of the holder requires verifying the identity of the card holder, before being able to use these biometric data during subsequent uses of the card.

Indeed, it should be made sure that the biometric data stored on the card are indeed associated with the digital fingerprint of the card holder, when these biometric data are used later in order to verify that the user of the card is indeed the card holder.

A plurality of methods can be implemented to securely record in the card the biometric data of the card holder.

In particular, a first solution consists in carrying out with a card issuer the recording of the biometric data on the card. The identity of the card holder can then be verified using an identity document. The biometric data of the card holder can be acquired immediately after having carried out the verification of the identity of the holder.

This solution has the drawback of requiring the card holder to go to the card issuer.

Another solution consists in carrying out the recording of the biometric data remotely (that is to say, without requiring the card holder to go to a card issuer).

It is then possible to carry out a recording of the biometric data of the card holder firstly, then a verification of the identity of the card holder only secondly in order to validate the biometric data recorded to make them usable.

The verification of the identity of the holder can be carried out by contacting the card issuer of the card holder or by entering a confidential code (PIN code) associated with the card during a subsequent use of the card.

The entry of the confidential code can be combined with a new acquisition of the biometric data of the user of the card in order to verify if these biometric data correspond to the biometric data of the holder recorded beforehand in the card.

Such a solution has the drawback of being performed in two stages. Therefore, this solution is not very convenient for the card holder.

Another solution may consist in transmitting a confidential code by post or by email to the card holder. This confidential code can be used to initialize a session for recording the biometric data of the card.

Such a solution has the drawback of requiring a use and management of an additional confidential code for the card holder and for the card issuer.

Therefore, there is a need to propose a solution for recording in a biometric card the biometric data of the card holder simply, quickly and securely.

BRIEF SUMMARY

According to one aspect, a method for recording biometric data of a holder on a card is proposed, for example, a payment card, including a microcontroller configured to communicate via a secure communication channel with a remote server comprising an account linked to the card holder, the method comprising:
  authenticating the holder on an application of a device configured to communicate with said server and said card, then
  authenticating the server by the card via the secure communication channel by means of the application of said device, then
  recording the biometric data of the holder by a fingerprint reader of the card controlled by the microcontroller of the card if the server is authenticated by the card.

Such a recording method makes it possible to record, on a card, the biometric data of a holder of this card simply, quickly and securely.

In particular, the recording may be carried out remotely via the application of said device. The card holder therefore does not need to go to the establishment associated with the account of the holder to carry out their recording of biometric data on the card.

Furthermore, the fact of using a secure communication channel by means of the application of the device after authenticating the user on the application of the device makes it possible to avoid using an additional confidential code to start recording the biometric data on the card. Furthermore, the application of the device does not know the encryption key used for such a secure communication.

In an advantageous implementation, authenticating the holder on the application of the device comprises acquiring confidential data entered by the holder into the application, then verifying the compliance of the confidential data by the server.

Preferably, authenticating the server by the card comprises:
  transmitting, by the card, data to be encrypted to the server by means of the application of the device,
  encrypting by the server said data to be encrypted using an encryption key so as to generate first encrypted data,
  transmitting said first encrypted data by the server to the card by means of the application of the device,
  encrypting by the microcontroller of the card said data to be encrypted by the same encryption key so as to generate second encrypted data, then verifying by the microcontroller of the card that the first data encrypted by the server and the second data encrypted by the microcontroller of the card are identical.

For example, the authentication can be performed according to a secure communication protocol such as "SCP" (Secure Channel Protocol), particularly according to the "SCP03" (Secure Channel Protocol 03") version, defined by the "GlobalPlatform" organization. The SCP03 protocol further makes a mutual authentication between the card and the server possible.

The data to be encrypted are a combination of data of the server designated by the expression "Host challenge" and of data of the card designated by the expression "Card Challenge." The first encrypted data may be designated by the expression "Host cryptogram."

Preferably, said device communicates with the card by means of a near field communication or by means of a card reader.

According to one aspect, a card is proposed, for example, a payment card, comprising:
a digital fingerprint reader,
a microcontroller configured to communicate with a remote server including an account linked to a card holder via a secure communication channel and to:
command the digital fingerprint reader so as to record the biometric data of the card holder,
carry out, before recording the biometric data of the card holder, an authentication procedure of the remote server by means of an application of an external device via said secure communication channel.

According to another aspect, a device is proposed comprising an application configured to:
communicate with a card, such as described above, and a server comprising an account linked to a card holder,
authenticate with the server that a user of the card is indeed the card holder,
be used as an intermediary during an authentication of the server by the card via a secure communication channel,
start recording the biometric data of the holder on the card by the fingerprint reader of the card, if the server is authenticated by the card.

According to another aspect, a server is proposed comprising an account linked to a card holder such as described above, the server being configured to:
communicate with an application of a device such as described above,
authenticate with the application of the device that a user of the card is indeed the card holder,
carry out an authentication procedure of this server by the card by means of said application of the device via a secure communication channel.

According to another aspect, a system is proposed comprising:
a card such as described above,
a device such as described above, and
a server such as described above.

BRIEF DESCRIPTION OF THE SEVERAL VIEWS OF THE DRAWINGS

Other advantages and features of the invention will become apparent upon reading the detailed description of embodiments, which are in no way limiting, and of the appended drawings in which:

FIG. 1 illustrates a diagram of one embodiment of a card CRT, particularly a payment card.

FIG. 2 illustrates a diagram of a method for initializing a secure communication channel between a banking server SRV and a card, particularly the card CRT described above.

FIG. 3 illustrates a diagram of an embodiment of a method for recording the biometric data in the card CRT described above.

FIG. 4 illustrates a diagram of an embodiment of a method for recording the biometric data in the card CRT described above.

DETAILED DESCRIPTION

FIG. 1 illustrates a diagram of one embodiment of a card CRT, particularly a payment card.

The card CRT comprises a microcontroller MCU configured to communicate in near field with a device APP, particularly a multi-function telephone. Alternatively, the card CRT can communicate with the device APP using a card reader connected to the device APP for example. The card CRT is issued by a bank BNK to a given person designated by the expression "card holder" hereinafter.

The microcontroller MCU is a secure element. In particular, the microcontroller MCU comprises an operating system JOS. For example, the operating system JOS is a Java card operating system. Java card a is software technology that makes it possible to securely run Java-based applications (applets) on an integrated circuit. Java Card technology combines a subset of the Java programming language with an optimized execution environment for the secure elements, particularly for the microcontroller MCU.

The microcontroller MCU also comprises a fingerprint reader DR for acquiring biometric data associated with a digital fingerprint read by the fingerprint reader.

The microcontroller MCU also comprises a memory MEM for storing the biometric data associated with the fingerprint read by the fingerprint reader.

The microcontroller MCU comprises a biometric application BMNG configured to command the fingerprint reader DR and to implement a recording of biometric data of the card CRT holder in said memory MEM of the microcontroller MCU.

The microcontroller MCU may comprise a radio frequency software library RFL.

The software library includes a set of programs configured to implement functions for communicating in near field with the device APP by using a near field communication circuit NFCT of the microcontroller.

The microcontroller MCU also comprises a secure domain SD adapted to store cryptography keys that can be used to establish a secure communication channel between the card CRT and a server, particularly a banking server SRV. These cryptography keys are recorded in a secure memory MEM of the microcontroller MCU and are identified by a key version number KVN. FIG. 2 described below illustrates an implementation for recording such cryptography keys.

The device comprises a banking application configured to communicate with said card CRT and a banking server SRV comprising an account linked to the card CRT holder. In particular, the device APP may comprise a near field communication circuit for communicating in near field with the card CRT. Alternatively or in combination, the device APP may also be configured to communicate with the card CRT via a card reader.

This banking application is provided by the bank BNK of the card CRT holder. The banking application is configured to make it possible to record biometric data on the card CRT, such as described hereinafter in relation to FIG. 3. The banking application is configured to communicate with the banking server SRV.

The device APP can be configured to automatically open the banking application when the card CRT is detected by its near field communication circuit.

FIG. 2 illustrates a diagram of a method for initializing a secure communication channel between a banking server SRV and a card, particularly the card CRT described above.

The secure communication channel may be a secure communication protocol such as "SCP" (Secure Channel Protocol), particularly according to the "SCP03" version, defined by the "GlobalPlatform" organization.

Such a method is implemented before giving the card CRT to the designated holder.

In particular, the banking server SRV comprises a master key IMK.

The method comprises a step 20 of generating keys IccMK. In this step 20, the banking server SRV generates a key IccMK from the master key IMK and from the key data ICC. The key data ICC comprise an identification number of the card holder as well as a serial number of the microcontroller. In particular, the key IccMK is obtained by an "AES" (Advanced Encryption Standard) encryption from the master key IMK and from the key data ICC.

The method comprises a step 21 of generating static keys. In this step 21, the banking server SRV generates a plurality of static keys IccMK_ENC (for the "AES" encryption/decryption), IccMK_MAC (for authenticating the secure channel and for verifying/generating the message authentication code MAC), IccMK_DEK (for decrypting sensitive data) from the key IccMK. In particular, the banking server SRV generates a set of static keys such as defined by the "SCP03" protocol.

The method comprises a step 22 of transmitting keys to the card CRT. In particular, in this step 22, the banking server SRV transmits the static keys, a key version number KVN associated with the static keys transmitted and the key data ICC to the card CRT. The static keys, a key version number KVN and the key data ICC are subsequently recorded in the secure domain SD of the card CRT (step 23).

In one embodiment, the sharing of static keys may be performed by using an intermediate personalization server (not shown) for steps 20, 21 and 22. Such an intermediate personalization server is then configured to share the static keys with a banking server SRV and with the card CRT.

The card CRT can subsequently be given to the designated card CRT holder.

The banking server SRV and the microcontroller of the card CRT then know the static keys for establishing a secure communication channel between the banking server SRV and the card CRT.

The banking application of the device APP does not know these static keys but is subsequently used as proxy between the banking server SRV and the card CRT to carry out the recording of the biometric data of the holder on the card CRT.

FIGS. 3 and 4 illustrate a diagram of an embodiment of a method for recording the biometric data in the card CRT described above.

In particular, as illustrated in FIG. 3, the method comprises a step 30 of authenticating the user. In this step 30, the user is authenticated on the banking application of said device. The authentication of the user is performed from data CRDT entered in the application of the user that are subsequently verified by the banking application of the device, by communicating particularly with the banking server SRV (step 31).

In particular, the user can enter in the application an identifier that is associated with it as well as a personal code. The personal code of the user can be defined from a code provided by the bank BNK of the user for example. In particular, the code provided by the bank BNK may be a temporary code used to enter the personal code defined by the user.

The personal code and the identifier entered make it possible for the bank BNK to authenticate the user by means of the application.

Once the user has been authenticated, the method comprises a step 32 of selecting a biometric application BMNG. In this step 32, the banking application of the device APP selects the biometric application BMNG of the card CRT via a near field communication between the device APP and the card CRT or via a card reader.

The method subsequently comprises mutually authenticating the banking server SRV and the card CRT. This authentication can be performed according to a secure communication protocol by means of the application of the device APP. For example, the communication protocol used may be the "SCP" (Secure Channel Protocol), particularly according to the "SCP03" version, defined by the "GlobalPlatform" organization.

In particular, the method subsequently comprises a step 33 of transmitting an authentication request R_REQ.

In this step 33, the banking application of the device APP transmits an authentication request R_REQ to the card CRT. The authentication request R_REQ comprises the key version number KVN for indicating the set of static keys to be used by the card CRT. The authentication request R_REQ also comprises host challenge data H_CHL. These host challenge data H_CHL are generated by the banking application of the device APP.

The authentication request R_REQ corresponds particularly to the INITIALIZE UPDATE command defined by the "SCP03" protocol. The host challenge data H_CHL correspond to the data to be encrypted by the card CRT. This request also makes it possible to create a secure communication channel between the biometric application BMNG of the card CRT and the banking application of the device APP.

The authentication request may be prepared by the banking server SRV and transmitted by the latter to the banking application of the device APP or may be generated directly by the banking application of the device APP.

The method subsequently comprises a step 34 of generating a cryptographic value, called card cryptogram. In this step 34, the microcontroller MCU of the card CRT selects the set of static keys indicated by the key set number KVN then generates various session keys. These session keys are subsequently used to generate a card cryptogram from the host challenge data H_CHL of the banking server SRV and from the card challenge data C_CHL.

The method subsequently comprises a transmission step 35. In this step 35, the card CRT transmits the key data ICC, the key version number KVN, card challenge data C_CHL and the card cryptogram.

The method subsequently comprises a step 36 of requesting authentication of the card CRT with the banking server SRV. In this step 36, the application of the device APP transmits an authentication request AUT_REQ to the banking server by using said secure communication protocol. The request AUT_REQ comprises the host challenge data H_CHL, the card cryptogram C_CRYPT, the card challenge data C_CHL, the key version number KVN and the key data ICC. The key data ICC make it possible for the banking server SRV to retrieve/regenerate the static keys of the card from a master key IMK of the banking server SRV.

The method subsequently comprises a verification step 37. In this verification step 37, the banking server SRV retrieves static keys IccMK_ENC, IccMK_MAC, IccMK_DEK of the card from the key version number KVN, from the master key IMK and from derivation information specific to the card received by the authentication request AUT_REQ. The banking server SRV subsequently generates session keys S_ENC, S_MAC, S_DEK (not shown). These session keys are generated from static keys IccMK_ENC, IccMK_MAC, IccMK_DEK of the card that are associated with a given key version number KVN.

These session keys S_ENC, S_MAC, S_DEK are subsequently used to check the card cryptogram C_CRYPT. In particular, the session keys S_ENC, S_MAC are used to generate a cryptogram from the host challenge data H_CHL and the card challenge data C_CHL. The server subsequently compares the generated cryptogram with the card cryptogram C_CRYPT. If the two cryptograms are identical then the banking server SRV authenticates the card CRT.

The session keys S_ENC, S_MAC are also used to generate a cryptographic value H_CRYPT, called server cryptogram, from the card challenge data C_CHL and from the host challenge data H_CHL.

The banking server SRV also generates a message authentication code MAC using the session key S_MAC.

The method also comprises a step 38 of transmitting an authentication message AUT_MES from the server SRV to the banking application of the device APP. In this step, the banking server transmits the authentication message AUT_MES to the banking application of the device APP via said secure communication protocol established between the banking server SRV and the device APP. The authentication message AUT_MES comprises the host cryptogram and a message authentication code MAC.

The method subsequently comprises a step 39 of transmitting the authentication message AUT_MES from the device to the card CRT. The transmission of the authentication message AUT_MES corresponds particularly to the EXTERNAL AUTHENTICATE command defined by the "SCP03" protocol. In this step, the authentication message AUT_MES received in step 38 by the device is transmitted to the card CRT by the device via a near field communication or via a card reader.

The method subsequently comprises a verification step 40. In this step 40, the microcontroller MCU of the card CRT calculates firstly the message authentication code MAC of the message received AUT_MES thanks to its key S_MAC. Thus, it compares the message authentication code MAC received and the message authentication code MAC calculated. If these two message authentication codes MAC are identical, then the microcontroller MCU of the card CRT generates a cryptogram from the card challenge data C_CHL and the host challenge data H_CHL by using the session keys then compares this cryptogram with the host cryptogram H_CRYPT.

If these two cryptograms correspond, then the method comprises a step 41 wherein the card CRT transmits a validation message VAL_MES of the authentication to the banking application of the device. Thus, the banking application of the device APP knows that the banking server SRV and the card CRT are mutually authenticated (AUT_OK).

Once the mutual authentication of the banking server SRV and of the card CRT has been performed, the method comprises recording the biometric data on the card CRT, such as illustrated in FIG. 4. The recording the biometric data is performed directly after the mutual authentication of the banking server SRV and of the card CRT. If the authentication between the card and the server has not finished, then the method for recording biometric data on the card is not performed.

In particular, the method comprises at least one step 42 of commanding a recording. In this step 42, the banking application of the device APP generates a recording command that it transmits to the card CRT via a wireless communication or a card reader. The recording command makes it possible to command a recording of the biometric data associated with a fingerprint of the user by the biometric application BMNG of the card CRT. In the implementation illustrated in FIG. 4, two recording commands ENRL_C #1, ENRL_C #2 are successively emitted in order to carry out the recording of biometric data corresponding to two fingerprints of the user. The application can display a visual indication on the screen of the device in order to indicate to the user that the card CRT is ready to record biometric data.

Each recording command is followed by a recording step 43. In this step 43, the microcontroller MCU of the card CRT carries out the recording of biometric data of the user. For this purpose, the user uses the fingerprint reader DR of the card CRT by applying their digital fingerprint on the fingerprint reader. The fingerprint reader DR carries out the acquisition of the digital fingerprint of the user and generates biometric data TMPL #1, TMPL #2 associated with the fingerprints of the user for the respective commands ENRL_C #1 and ENRL_C #2. The biometric data may correspond to the data acquired by the fingerprint reader DR or to the data obtained by compression of the acquired data or also to information extracted from the acquired data. These biometric data are subsequently recorded in a memory MEM of the microcontroller of the card CRT.

The method subsequently comprises a step 44 wherein the banking application of the device APP transmits an end of recording message END_R to the biometric application BMNG of the card CRT. This end of recording message END_ENRL makes it possible to record the biometric data of the card holder.

The method subsequently comprises a step 45 of activating the biometric data TMPL #1, TMPL #2. In this step 45, the biometric application BMNG subsequently activates the biometric data recorded. Activation of the biometric data is permitted due to the authentication of the banking server SRV by the card CRT.

Once the biometric data have been activated, the method comprises a step 46 wherein the biometric application BMNG of the card transmits a confirmation message ENRL_OK to the banking application of the device APP. This confirmation message ENRL_OK makes it possible to indicate to the banking application that the biometric data recorded have indeed been activated. The activated biometric data can subsequently be used during a subsequent use of the card CRT in order to control whether the user of the card CRT does indeed correspond to the actual card CRT holder by comparing the biometric data of the user acquired by the fingerprint reader DR with the biometric data recorded on the card.

As seen above, before recording the biometric data on the card CRT, the card CRT holder simply needs to identify themselves on the banking application of the device APP then carry out the recording by placing at least one finger on the fingerprint reader DR.

Indeed, the mutual authentication is performed invisibly for the user. Such a method for recording biometric data is therefore simple and quick to implement for the card holder.

In particular, the card holder does not need to go to a bank to carry out the recording of their biometric data. In addition, the card holder does not need to use a code dedicated to recording their biometric data.

A method for recording biometric data of a holder on a card (CRT) including a microcontroller (MCU) configured to communicate via a secure communication channel with a remote server (SRV) comprising an account linked to the card holder, may be summarized as including: authenticating the holder on an application of a device (APP) configured to communicate with said server (SRV) and said card (CRT); authenticating the server (SRV) by the card (CRT) via the secure communication channel by means of the application of said device (APP); and recording the biometric data of the holder by a fingerprint reader (DR) of the card (CRT) controlled by the microcontroller (MCU) of the card (CRT) if the server (SRV) is authenticated by the card (CRT).

Authenticating the holder on the application of the device (APP) may include acquiring confidential data entered by the holder into the application, then verifying the compliance of the confidential data by the server (SRV).

Authenticating the server (SRV) by the card (CRT) may include: transmitting, by the card (CRT), data to be encrypted to the server (SRV) by means of the application of the device (APP); encrypting by the server (SRV) said data to be encrypted using an encryption key so as to generate first encrypted data; transmitting said first encrypted data by the server (SRV) to the card by means of the application of the device (APP); encrypting by the microcontroller (MCU) of the card (CRT) said data to be encrypted by the same encryption key so as to generate second encrypted data; and verifying by the microcontroller (MCU) of the card (CRT) that the first data encrypted by the server and the second data encrypted by the microcontroller of the card are identical.

Said device (APP) may communicate with the card by means of a near field communication or by means of a card reader.

A card may be summarized as including: a digital fingerprint reader (DR); and a microcontroller (MCU) configured to communicate with a remote server (SRV) including an account linked to a card holder via a secure communication channel and to: command the digital fingerprint reader so as to record the biometric data of the card holder; and carry out, before recording the biometric data of the card holder, an authentication procedure of the remote server by means of an application of an external device (APP) via said secure communication channel.

A device may be summarized as including an application configured to: communicate with a card (CRT) as described above and a server (SRV) comprising an account linked to a card holder; authenticate with the server (SRV) that a user of the card (CRT) is indeed the card holder; be used as an intermediary during an authentication of the server by the card via a secure communication channel; and start recording the biometric data of the holder on the card by the fingerprint reader of the card, if the server is authenticated by the card.

A server may be summarized as including an account linked to a card holder as described above, the server being configured to: communicate with an application of a device (APP) as described above; authenticate with the application of the device (APP) that a user of the card (CRT) is indeed the card holder; and carry out an authentication procedure of this server by the card (CRT) by means of said application of the device (APP) via a secure communication channel.

A system may be summarized as including: a card (CRT) as described above; a device (APP) as described above; and a server (SRV) as described above.

Of course, the present invention is likely to have various variants and modifications that will become apparent to the person skilled in the art. For example, the method for recording biometric data may simply comprise authenticating the server by the card, without authenticating the card by the server.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
authenticating, using an application executing on a device configured to communicate with a card and with a remote server, a card holder associated with the card, the card including a microcontroller configured to communicate with the remote server via a secure communication channel;
authenticating of the server by the card via the secure communication channel and the application executing on the device; and
in response to authentication of the server by the card, recording biometric data of the card holder via a fingerprint reader of the card controlled by the microcontroller, wherein authenticating the server by the card comprises:
transmitting, by the card, data to be encrypted to the server via the application;
encrypting, by the server, the data to be encrypted using an encryption key, generating first encrypted data;
transmitting the first encrypted data by the server to the card via the application;
encrypting, by the microcontroller of the card, the data to be encrypted using the encryption key, generating second encrypted data; and
verifying, by the microcontroller of the card, that the first encrypted data and the second encrypted data are identical.

2. The method according to claim 1, wherein authenticating the card holder comprises:
acquiring confidential data entered by the holder into the application; and
verifying the acquired confidential data by the server.

3. The method according to claim 1, comprising:
performing near field communications between the device and the card;
performing communications between the device and the card via a card reader; or
combinations thereof.

4. A card, comprising:
a digital fingerprint reader; and a microcontroller coupled to the digital fingerprint reader, wherein the microcontroller, in operation:

initiates authentication, by an application executing on a device configured to communicate with the card and with a remote server, of a card holder associated with the card;

authenticates the server via a secure communication channel between the card and the server and via the application executing on the device; and in response to authentication of the server, controls the digital fingerprint reader to record biometric data of the card holder, wherein the microcontroller authenticates the server by:

transmitting, via the secure communication channel, data to be encrypted to the server;

receiving, from the server via the secure communication channel, first encrypted data encrypted using an encryption key;

encrypting the data to be encrypted using the encryption key, generating second encrypted data; and verifying the first encrypted data and the second encrypted data are identical.

5. The card of claim 4, wherein authenticating the card holder comprises:

acquiring confidential data entered by the holder into the application; and verifying the acquired confidential data by the server.

6. The card according to claim 4, comprising:

near field communication circuitry, which, in operation, performs near field communications between the device and the card.

7. The card according to claim 4, wherein the microcontroller, in operation controls communications between the card and a card reader of the device.

8. A device, comprising:

interface circuitry, which in operation, exchanges communication with a card and with a remote server; and processing circuitry coupled to the interface circuitry, wherein the processing circuitry in operation, executes an application to:

authenticate, with the remote server, a card holder associated with the card;

serve as an intermediary in an authentication of the server by the card via a secure communication channel; and in response to authentication of the server by the card, initiate recording of biometric data of the card holder by a digital fingerprint reader of the card, wherein authenticating the server by the card comprises:

transmitting, via the secure communication channel, data to be encrypted from the card to the server;

receiving by the card, from the server via the secure communication channel, first encrypted data encrypted using an encryption key;

encrypting, by the card, the data to be encrypted using the encryption key, generating second encrypted data; and verifying, by the card, the first encrypted data and the second encrypted data are identical.

9. The device of claim 8, wherein authenticating the card holder comprises:

acquiring confidential data entered by the holder into the application; and verifying the acquired confidential data via the server.

10. The device according to claim 8, comprising:

near field communication circuitry, which, in operation, performs near field communications with the card.

11. The device according to claim 8, comprising:

a card reader, which, in operation, performs communication with the card.

12. A system, comprising:

a card; and a device including:

interface circuitry, which in operation, exchanges communication with the card and with a remote server; and processing circuitry coupled to the interface circuitry, wherein the processing circuitry in operation, executes an application to:

authenticate, using the remote server, a card holder associated with the card;

serve as an intermediary in an authentication of the server by the card via a secure communication channel; and in response to authentication of the server by the card, initiate recording of biometric data of the card holder by a digital fingerprint reader of the card, wherein authenticating the server by the card comprises:

transmitting, via the secure communication channel, data to be encrypted from the card to the server;

receiving by the card, from the server via the secure communication channel, first encrypted data encrypted using an encryption key;

encrypting, by the card, the data to be encrypted using the encryption key, generating second encrypted data; and verifying, by the card, the first encrypted data and the second encrypted data are identical.

13. The system of claim 12, wherein authenticating the card holder comprises:

acquiring confidential data entered by the holder into the application; and verifying the acquired confidential data using the server.

14. The system of claim 12, comprising the server.

* * * * *